(12) United States Patent
Kleemann et al.

(10) Patent No.: US 6,788,465 B2
(45) Date of Patent: Sep. 7, 2004

(54) LITTROW GRATING AND USE OF A LITTROW GRATING

(75) Inventors: Bernd Kleemann, Aalen (DE); Klaus Heidemann, Oberkochen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/863,002

(22) Filed: May 22, 2001

(65) Prior Publication Data

US 2002/0008912 A1 Jan. 24, 2002

(30) Foreign Application Priority Data

May 22, 2000 (DE) .......................................... 100 25 214

(51) Int. Cl.[7] ................................................. G02B 5/18
(52) U.S. Cl. ........................ 359/574; 359/569; 359/571
(58) Field of Search ................................. 359/574, 571, 359/572, 566, 569

(56) References Cited

U.S. PATENT DOCUMENTS

| | | | | |
|---|---|---|---|---|
| 3,045,532 A | | 7/1962 | Staunton ........................ | 88/14 |
| 4,991,937 A | * | 2/1991 | Urino .......................... | 350/401 |
| 5,279,924 A | | 1/1994 | Sakai et al. .................. | 430/290 |
| 5,461,239 A | | 10/1995 | Atherton ....................... | 250/566 |
| 5,629,804 A | * | 5/1997 | Tomono ........................ | 359/576 |
| 5,966,483 A | | 10/1999 | Chowdhury .................. | 385/37 |

FOREIGN PATENT DOCUMENTS

| | | |
|---|---|---|
| DE | 263 362 | 12/1988 |
| EP | 0 349 144 | 1/1990 |
| WO | WO 00/16134 | 3/2000 |

* cited by examiner

Primary Examiner—Mark A. Robinson
Assistant Examiner—Alessandro Amari
(74) Attorney, Agent, or Firm—Factor & Lake

(57) ABSTRACT

A Littrow grating (1) comprises a multiplicity of parallel diffraction structures (3) succeeding one another periodically. The latter are arranged on a support (2) defining a base area (4). A diffraction structure (3) comprises a blaze flank (5) inclined towards the base area (4) substantially at the Littrow angle ($\delta$). In addition the diffraction structure (3) comprises a counter-flank (6) which forms with the blaze flank (5) at the apex of a diffraction structure (3) an apex angle ($\alpha$) which is less than 90°. The counter-flank (6) comprises at least two substantially plane area sections (7, 8). The latter extend, bordering one another and inclined relative to one another through an angle of inclination ($\beta$), parallel with the extension direction of the diffraction structure (3). Due to the inclination of the at least two area sections (7, 8) relative to one another, the counter-flank (6) exhibits all in all a concave surface viewed from the light incidence side. A Littrow grating (1) of high reflectivity is obtained, which may be achieved with the removal of only a small amount of material at the manufacturing stage.

12 Claims, 2 Drawing Sheets

LITTROW GRATING AND USE OF A LITTROW GRATING

Figure 1:
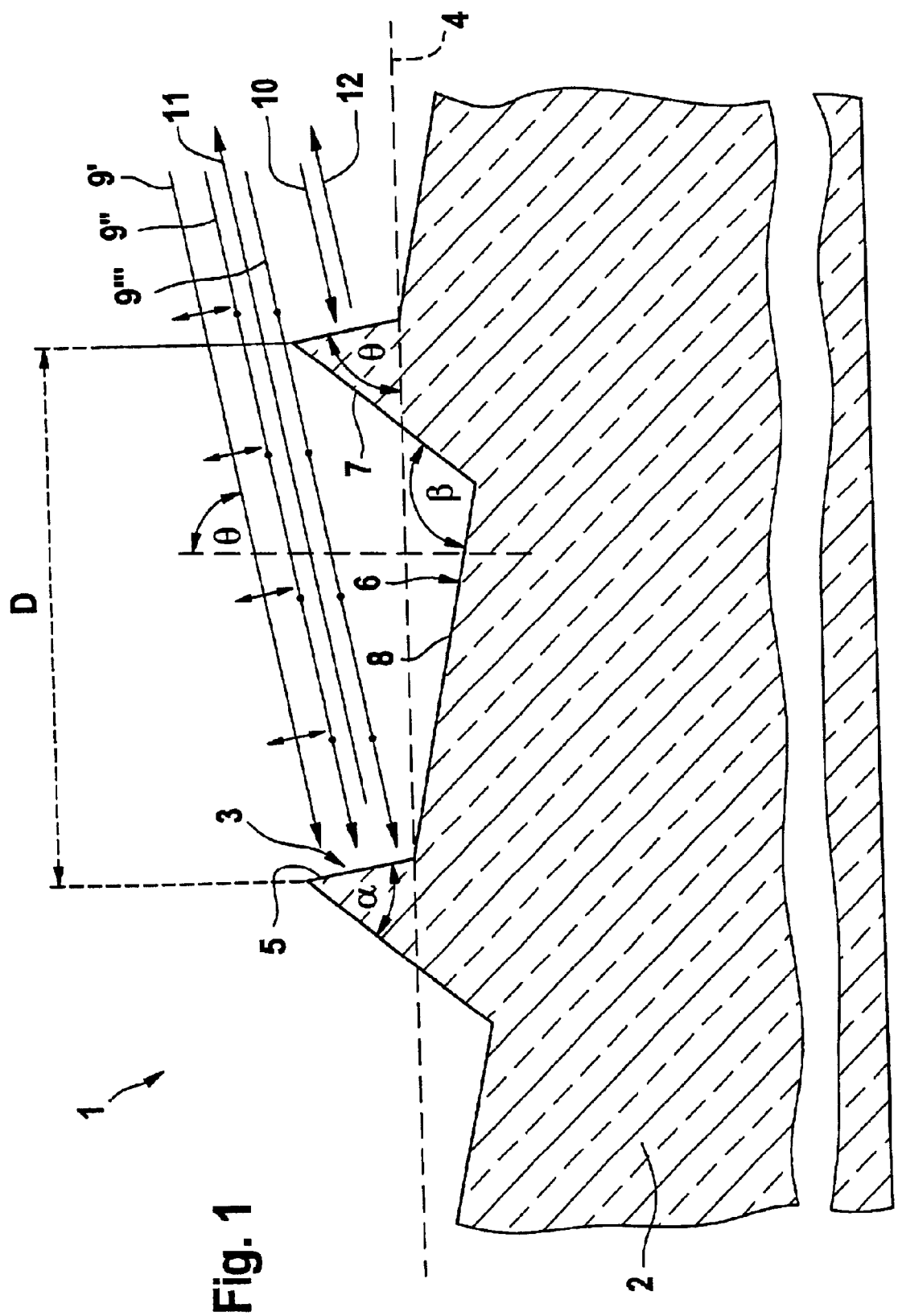

The invention relates to a Littrow grating with a multiplicity of parallel diffraction structures succeeding one another periodically, which are arranged on a support defining a base area and each incorporate a blaze flank inclined towards the base area substantially at the Littrow angle and a counter-flank, wherein the blaze flank and the counter-flank form at the apex of a diffraction structure an apex angle which is less than 90°. The invention also relates to uses for such a Littrow grating.

Such Littrow gratings are known commercially. They are used if a high reflection efficiency, i.e. a high diffraction efficiency in a Littrow arrangement, is required. An apex angle <90° results in the counter-flank, which is not exposed to light during the operation of the Littrow grating, being distanced from the path of the light beams impinging on the blaze flank. Calculations show that as a result an interaction in particular between the components of the incident light beams having TM polarisation and the counter-flank does not take place. Said interaction leads in the case of Littrow gratings with greater apex angles, at which the incident light beams run directly adjacent to the surface of the counter-flank, to an undesirable reduction in the reflection efficiency.

During the production of such known Littrow gratings a great deal of the material of the grating blank has to be removed on account of the apex angle <90°, because the counter-flank "dips" very far into the grating blank. Said need to remove a great deal of material during the production process makes the production of such known gratings complex and expensive.

It is therefore the object of the present invention to develop a Littrow grating of the kind mentioned in the introduction in such a way that it may be produced more simply and cheaply, without at the same time having to accept a reduction in the reflection efficiency.

Said object is achieved according to the invention by the fact that the counter-flank comprises at least two substantially plane area sections which, bordering one another and inclined relative to one another by an angle of inclination, extend parallel with the extension direction of the diffraction structure, wherein due to the inclination of the at least two area sections relative to one another the counter-flank all in all comprises a concave surface viewed from the light incidence side.

It is admittedly brought about by such a facetting of the counter-flank into at least two area sections that in the area of the apex of the diffraction structure the counter-flank rapidly removes itself from the path of the light beams (apex angle <90°); however, because of the concave facetting and the resulting not so strongly inclined second area section the counter-flank does not dip as far into the grating blank as would be the case with a plane counter-flank. The amount of material removed during the production of the Littrow grating is therefore reduced, which simplifies the production and reduces its price.

Preferably the area sections exhibit, measured normal to the extension direction of the diffraction structures, a width ratio of 0.5 to 2. With such a width ratio, with which one area section is at most twice as wide as the other, the area of the counter-flank in which the two area sections border one another, with given angle of inclination and given apex angle, is relatively far removed from the light path of the incident light beams. The interaction of the incident light beams with the counter-flank is thereby optimally small.

The angle of inclination may lie in the range from 90° to 150°. With such a choice of the angle of inclination a good reduction in the material which has to be removed to produce the Littrow grating is obtained.

Preferably the Littrow grating consists of quartz glass. Such materials may be worked by reactive ion beam etching (RIBE) or by reactive ion etching (RIE) and are therefore considered for the holographic production of the diffraction structures according to the invention. Alternatively a crystalline material may be used as the material for the Littrow grating, such as e.g. silicon, wherein the crystal surface may then additionally be aligned for the crystallographic orientation of the crystal in such a way that a privileged direction is obtained for the working, e.g. by anisotropic chemical etching with KOH. Said privileged direction may be exploited e.g. for the setting of the angle of inclination or of the apex angle. If the diffraction grating consists of doped quartz, the holographic production process is further simplified, since said material is because of its advantageous expansion characteristics well suited both for such a production process and for use.

The Littrow grating may comprise a coating increasing the reflectivity. The reflection efficiency of the Littrow grating is thereby increased.

In the case of the use of a coating increasing the reflectivity the latter is preferably an aluminium coating. Such a coating is relatively cheap and exhibits a high achievable reflecting power.

Alternative possibilities of increasing the reflection efficiency by the choice of material are obtained if instead of a coating increasing the reflectivity the Littrow grating comprises a dielectric layer system, e.g. a plurality of mutually succeeding layers, e.g. of $Al_2O_3$ (high refractive index) and $MgF_2$ (low refractive index) or of $LaF_3$ (high refractive index) and $MgF_2$ (low refractive index), wherein the layer sequence is so chosen that a reflective layer of high efficiency results The blaze flank may exhibit a minimum width of g cos (theta), measured normal to the extension direction of the diffraction structures, wherein g designates the grating period of the Littrow grating and theta the Littrow angle. Such a width guarantees that the whole bundle of incident light beams may be reflected by the blaze flanks. If the blaze flank has exactly the width according to the specified calculation formula, a Littrow grating may be obtained with minimal removal of material.

It is a further object of the present invention to specify uses for the Littrow grating according to the invention in which the described advantages of the Littrow grating are put to good use. Said object is achieved by the preferred uses listed below:

A preferred use of the Littrow grating is one in a diffraction order of the incident light wavelength above or equal to the 15th diffraction order. With such a high diffraction order the dispersion of the Littrow grating for the selection of the reflected wavelength is advantageously high. At the same time the demands made of the production of the Littrow grating are not so high, since the grating period is proportional to the diffraction order.

An advantageous area of use of the Littrow grating is the diffraction of UV light with a wavelength which is less is than 250 nm. Such UV light sources are used in particular in projection lithography for the production of semiconductor structures in chip manufacture. With a Littrow grating according to the invention a wavelength which is narrowband and efficient may be selected for such a projection light source.

Figure 2:
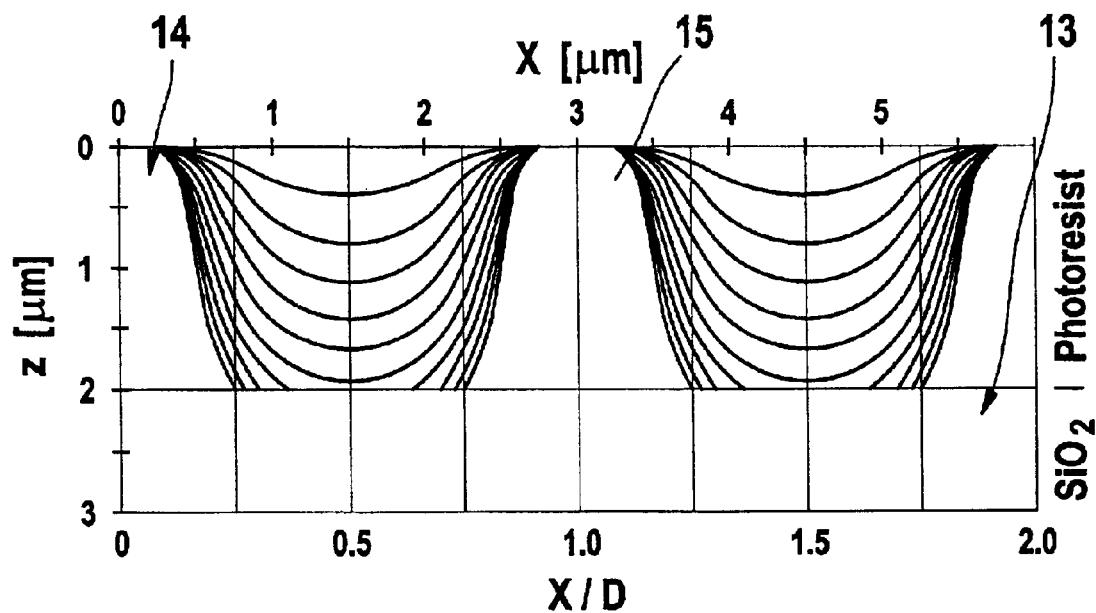
Figure 3:
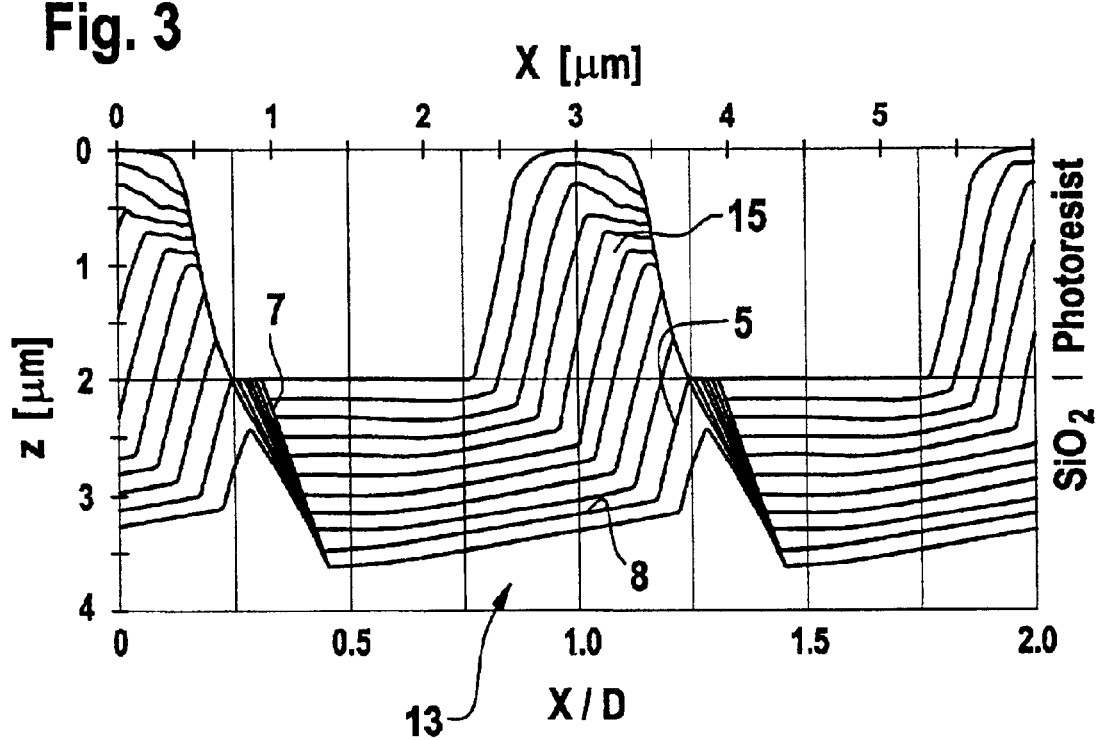

An embodiment of the invention will be explained in detail below from the drawing, in which FIG. 1 shows a section through a detail of a Littrow grating, wherein the sectioning plane runs at right angles to the extension direction of the diffraction structures of the Littrow grating and FIGS. 2 and 3 show instantaneous exposures during the production of a Littrow grating according to FIG. 1.

FIG. 1 shows a detail of a Littrow grating provided overall with the reference symbol 1, with a support 2, with which a multiplicity of parallel, periodically arranged diffraction structures 3 are integrally moulded, wherein the detail of FIG. 1 represents approximately two grating periods. The support 2 and the diffraction structures 3 consist of quartz glass. The grating period D, i.e. the distance between two diffraction structures 3, comes to 3002.5 nm.

The thickness of the support 2 is very great compared with the height of the diffraction structures 3, e.g. in the range of several millimetres, for which reason the support 2 is represented in broken lines in FIG. 1.

The surface of a diffraction structure 3 consists of three area sections which are each inclined differently with respect to a base area 4 which is defined by the support 2:

The area section inclined the steepest with respect to the base area 4 is formed by a blaze flank 5 which interacts with incident light beams in a manner still to be described. The reflecting area of the blaze flank 5 has in the plane of drawing of FIG. 1 a width of 777.1 nm and is inclined with respect to the base area 4 through an angle theta of 75°, which is a Littrow angle for incident light beams, as will likewise be described below.

The other two area sections of the diffraction structure 3, onto which during the operation of the Littrow grating 1 the light beams impinge directly and not as onto the blaze flank 5, form a counter-flank 6 extending between the respective blaze flanks 5 of two adjacent diffraction structures 3: a first area section 7 of the counter-flank 6 bounds with the blaze flank 5 bordering it an apex angle α of the diffraction structure 3 which is less than 90° and has in FIG. 1 a value of approx. 50°. A second area section 8 of the counter-flank 6 lies between the first area section 7 and the adjacent blaze flank 5 respectively.

The two mutually bordering area sections 7 and 8 are inclined relative to one another through an angle of inclination β of the order of approx. 120° in such a way that the counter-flank 6 is concave viewed from the light incidence side of the Littrow grating 1. The widths of the area sections 7, 8 normal to the extension direction of the diffraction structures 3, i.e. in the case of the area section 7 the distance between the bordering edges which are formed by the blaze flank 5 and the area section 7 on the one hand and by the area section 7 and the area section 8 on the other, and in the case of the area section 8 the distance between the bordering edges which are formed by the blaze flank 5 and the area section 8 on the one hand and by the area section 8 and the area section 7 on the other, have in FIG. 1 a width ratio of approx. 1 to 1.5.

Other width ratios, in particular a width ratio of 1 to 1, are also possible here, wherein optimal efficiency parameters of the Littrow grating 1 are obtained by alternate optimising of the widths as well as of the apex angle α and the angle of inclination β.

The Littrow grating 1 functions as follows:

The Littrow grating 1 is so arranged with respect to parallel incident light beams which are emitted by a light source (not shown), and of which the light beams 9', 9", 9''', 10 are shown by way of example in FIG. 1, that the blaze flanks 5 assume with the incident light beams 9, 10 the Littrow angle theta of 75° which is obtained for the specified grating period D and a light wavelength of 193.35 nm in thirtieth order. The specified light wavelength is that of an argon-fluoride excimer laser. The incident light beams 9, 10 may here be polarised both normal to the extension direction of the diffraction structures 3 (TM polarisation, light wave 9') and parallel with the extension direction of the diffraction structures 3 (TE polarisation, light waves 9", 9''') as is shown diagrammatically in FIG. 1.

With the chosen grating period D of the diffraction structures 3, the diffraction condition, i.e. the condition of constructive thirtieth-order interference, is met for light beams 11, 12 of the specified wavelength which are reflected back into the incidence direction. The Littrow grating 1 therefore acts for the incident light beams 9, 10 as a mirror which reflects the incident light beams 9, 10 in thirtieth diffraction order back into themselves.

There are obtained for the above-mentioned conditions the following efficiency parameters for the Littrow grating 1:

1. A reflection efficiency of $\geq 60\%$, which may be increased up to 75% as a function of the width ratio of the area sections 7, 8 and the size of the angle of inclination β, wherein the reflection efficiency is higher for TE polarisation than for TM polarisation, there being all in all, however, only relatively small reflection efficiency differences between TE and TM polarisation.
2. An absorption which is $\leq 20\%$, and by means of which the above-mentioned optimising of width ratio and angle of inclination of the area sections 7, 8 may be reduced to less than 10%, wherein here again the absorption parameter for TE polarisation is more favourable than for TM polarization.

The production of a Littrow grating after the manner of the Littrow grating 1 of FIG. 1 is illustrated by the production stages which are represented in FIGS. 2 and 3. The sectioning plane chosen for said figures is analogous to that of FIG. 1, however the diffraction structures 3 are in comparison with FIG. 1 shown mirrored about a plane normal to the plane of drawing of FIG. 1 and normal to the base area 4.

In the first production step a grating blank 13 of quartz glass is coated with a photoresist mask 14, exposed holographically and then developed. FIG. 2 shows a time dependence of the cross-section of said structure in the course of the development of the photoresist mask 14. The topmost curve of FIG. 2 represents the undeveloped photoresist mask 14, whose plane surface is parallel with that of the grating blank 13. In the course of the development there remain in the image centre and the lateral edges of FIG. 2 slates 15 between which the photoresist 14 is removed in such a way that all in all a semi-sinusoidal groove shape of the photoresist 14 is obtained on the grating blank 13. The individual curves which are shown in FIG. 2 indicate the instantaneous height of the photoresist 14 in the course of the photoresist removal at successive points in time The photoresist slats 15 have already according to the setting by the exposure the mutual spacing which corresponds to the spacing of 2958 nm desired for the diffraction structures 3.

In a second production step the structure obtained in the first step is subjected to an Ar-ion beam etching. FIG. 3 shows the time dependence of the cross-section of the grating blank 13 with the photoresist slats 15 during said process. Both the photoresist slats 15 and the grating blank 13 are removed in layers with inclined privileged direction until an etching depth of approx. 3.5 μm, measured from the original surface of the photoresist mask 14, is obtained in the grating blank 13. There are obtained here, by virtue of the inclined privileged etching direction, an asymmetrical profile deformation of the semi-sinusoidal groove profile produced in the first step and a structural transfer into the grating blank 13. The bottommost curve in FIG. 3 shows the situation on the attainment of the desired etching depth.

During the Ar-ion beam etching of the second production step the photoresist mask 14 is completely removed. There thus remains the Littrow grating after the manner of the Littrow grating 1 of FIG. 1 which has been formed from the grating black 13.

In order to increase the reflection efficiency, the Littrow grating 1 may also additionally be coated with a reflective aluminium coating (not shown), which is optionally also covered with an $MgF_2$ layer.

Alternative possibilities for increasing the reflection efficiency are the use of a dielectric layer system with alternating plies of a high-refractive index and a low-refractive index layer. There are considered as materials for the high-refractive index layer $Al_2O_3$ or $LaF_3$, and for the low-refractive index layer $MgF_2$.

What is claimed is:

1. A grating with a multiplicity of parallel diffraction structures succeeding one another periodically, which are arranged on a support defining a base area and each incorporate:
    a) a blaze flank inclined towards the base area at an angle θ; and
    b) a counter-flank which forms an apex α, with the blaze flank, wherein the apex angle is less than 90°;
    wherein the counter-flank comprises at least two substantially plane area sections which:
        i) border one another and are inclined relative to one another by an angle of inclination (β), so that the counter-flank all in all exhibits a concave surface viewed from the light incidence side, wherein the region where the plane area sections border is lower than the lowest area of the blaze flank;
        ii) extend parallel with the extension direction of the diffraction structure; and
        iii) are arranged such that if parallel light, which has a direction of propagation perpendicular to the blaze flank, impinges onto the grating, the counter-flank is not exposed to parallel light.

2. The grating according to claim 1, wherein the plane area sections exhibit a width ratio of 0.5 to 2 measured normal to the extension direction of the diffraction structures.

3. The grating according to claim 1, wherein the angle of inclination β lies in the range of 90° to 150°.

4. The grating according to claim 1, the grating further comprising quartz glass.

5. The grating according to claim 1, the grating further comprising a coating to increase the reflectivity.

6. The grating according to claim 5, wherein the coating is an aluminum coating.

7. The grating according to claim 1, further comprising a dielectric layer system.

8. The grating according to claim 7, wherein-the dielectric layer system comprises layers of $Al_2O_3$ and $MgF_2$.

9. The grating according to claim 7, wherein the dielectric layer system comprises layers of $LaF_3$ and $MgF_2$.

10. The grating according to claim 1, characterised in that the blaze flank (5) comprises, measured normal to the extension direction of the diffraction structures (3), a minimum width of g cos (θ), where g designates the grating period of the diffraction grating.

11. Use of a the grating according to claim 1 in a diffraction order of the incident light wavelength above or equal to the $15^{th}$ diffraction order.

12. Use of a the grating according to claim 1 for the diffraction of UV light with a wavelength that is less than 250 nm.

* * * * *